US008576224B2

(12) United States Patent
Vandenbrande et al.

(10) Patent No.: US 8,576,224 B2
(45) Date of Patent: Nov. 5, 2013

(54) METHODS AND APPARATUS FOR AUTOMATED PART POSITIONING BASED ON GEOMETRICAL COMPARISONS

(75) Inventors: Jan H. Vandenbrande, Sammamish, WA (US); Thomas A. Grandine, Issaquah, WA (US); Miriam Lucian, Seattle, WA (US); John Monahan, Seattle, WA (US)

(73) Assignee: The Boeing Company, Chicago, IL (US)

(*) Notice: Subject to any disclaimer, the term of this patent is extended or adjusted under 35 U.S.C. 154(b) by 1702 days.

(21) Appl. No.: 11/421,413

(22) Filed: May 31, 2006

(65) Prior Publication Data

US 2007/0279414 A1    Dec. 6, 2007

(51) Int. Cl.
*G06T 17/00* (2006.01)

(52) U.S. Cl.
USPC ........... 345/420; 345/581; 345/619; 345/621; 345/649; 345/672

(58) Field of Classification Search
USPC .............................................. 717/105; 703/1
See application file for complete search history.

(56) References Cited

U.S. PATENT DOCUMENTS

| | | | |
|---|---|---|---|
| 6,408,107 B1* | 6/2002 | Miller et al. | 382/294 |
| 6,828,963 B1* | 12/2004 | Rappoport | 345/419 |
| 2002/0030677 A1* | 3/2002 | Huang et al. | 345/420 |
| 2004/0128648 A1* | 7/2004 | Rappoport et al. | 717/105 |
| 2006/0004549 A1* | 1/2006 | Qamhiyah et al. | 703/1 |
| 2006/0140473 A1* | 6/2006 | Brooksby et al. | 382/154 |
| 2007/0014488 A1* | 1/2007 | Chen et al. | 382/294 |

OTHER PUBLICATIONS

Han and Regli, Manufacturing Feature Recognition from Solids Models: A Status Report, IEEE Transactions on Robotics and Automation, vol. 16, No. 6, pp. 782-796, Dec. 2000.
Dimitriy Bespalov, Cheuk Yiu Ip, William C. Regli, Joshua Shaffer, "Benchmarking CAD search techniques," ACM Symposium on Solid Modeling and Applications, Jun. 2005.
Hungarian Algorithm, Wikipedia entry (Mar. 31, 2006) http://en.wikipedia.org/wiki/Hungarian_method.

* cited by examiner

*Primary Examiner* — Phi Hoang
(74) *Attorney, Agent, or Firm* — Yee & Associates, P.C.

(57) ABSTRACT

A method of determining a rigid motion between a master solid model and an approximated target model (or, more generally, between any two models having different types) includes identifying, within each model, geometrical entities having a unique characteristic, and then determining the best match between the identified geometric entities. The system provides, in machine-readable form, a master model comprising a precise definition of a three-dimensional solid and a target model comprising a simplified definition of the three-dimensional solid. Then it identifies a first set of geometric entities (e.g., planar faces) within the master model that have a unique characteristic (e.g., planar area), and identifies a second set of geometric entities in the target model that have the unique characteristic. The system then determines a best match between a member of the first set of geometric entities and a member of the second set of geometric entities using, for example, a Hungarian matching algorithm. Linear edges of matched faces are compared to determine the appropriate rigid motion.

17 Claims, 5 Drawing Sheets

METHODS AND APPARATUS FOR AUTOMATED PART POSITIONING BASED ON GEOMETRICAL COMPARISONS

TECHNICAL FIELD

The present invention generally relates to assemblies produced using computer-aided design (CAD) and, more particularly, to automated positioning of modeled parts having diverse model types.

BACKGROUND

Computer-aided-design (CAD) has achieved wide popularity in a number of industries, as it provides an efficient way to design and model three-dimensional solids. As a result, many organizations have large databases of models that correspond to legacy assemblies. These models vary widely in type, however, and many of these model types were designed to be compact in order to reduce storage size and computational complexity.

For example, while it is common today to represent three-dimensional solids in a precise way using boundary representation (BRep), many legacy models exist only in a simplified, less precise form—e.g., as tessellated models. These tessellated models were generally derived from BRep models to save space and facilitate viewing large assemblies. Because tessellated models approximate curved surfaces using planar regions, the geometric properties of the model (such as areas and number of components) and the physical properties (such as mass properties) are different from those of the ideal, precise model. For example, the center-of-gravity and principal axes of tessellated models can vary significantly from the precise model.

It is therefore desirable to replace the relatively imprecise simplified models with precise, boundary-representation models in a CAD assembly. In many systems, this involves providing an "instance" of an authoritative (or "master") model, and applying a rigid body motion (rotation and translation) to that model such that it spatially matches the target model. This is a difficult task, however, as it is not trivial to determine the appropriate rigid body motion which will position the exact model—the master—at the position occupied by the simplified, target model. The mass properties of the target model—center of gravity, principal axes, etc.—cannot be used to achieve this, because, as stated above, their values are sufficiently different from those of the master model that accurate positioning cannot be achieved.

While a human operator might be able to place models in the correct location on a part-by-part basis, it is an intractable task for such an operator to do so for an entire assembly, as such assemblies might include thousands or even millions of individual models. It is therefore desirable to automate this task.

Accordingly, there is a need for efficient and automatic positioning of modeled parts having diverse types. Furthermore, other desirable features and characteristics of the present invention will become apparent from the subsequent detailed description and the appended claims, taken in conjunction with the accompanying drawings and the preceding technical field and background.

BRIEF SUMMARY

In general, the present invention relates to a method of determining a rigid motion between two models of different types by identifying, within each model, geometrical entities having a unique characteristic, and then determining the best match with respect to that characteristic between the identified geometric entities. In doing so, the invention makes use of the fact that planar faces and linear edges are preserved during tessellation. The invention may be embodied in one form by: providing, in machine-readable form, a master model comprising a precise definition of a three-dimensional solid and a target model comprising a simplified definition of the three-dimensional solid; identifying a first set of geometric entities (e.g., linear edges) within the master model that have a unique characteristic (e.g., arc length); identifying a second set of geometric entities in the target model that have the unique characteristic; and determining a best match between a member of the first set of geometric entities and a member of the second set of geometric entities to determine the appropriate rigid motion.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should be appreciated that any processing steps described as being performed by a computer system, microprocessor, or software may in fact be realized by any number of hardware, software, and/or firmware components configured to perform the specified functions. For the sake of brevity, conventional techniques and systems used in connection with computer-aided design (CAD), geometric modeling, and graph theory are not described in exhaustive detail herein.

In general, the present invention relates to a method of determining a rigid motion between a first model (e.g., a "master" model of a part) and a second model (e.g., a "target" model of the part) by identifying, within each model, geometrical entities having a unique characteristic, and then determining the best match between those geometric entities to derive an appropriate rigid motion (i.e., translation and/or rotation) that will result in spatial matching of the two models. The master and target model may be different representations of a part (e.g., BRep and tessellated) or the same representations (BRep and BRep, etc.).

Figure 1:
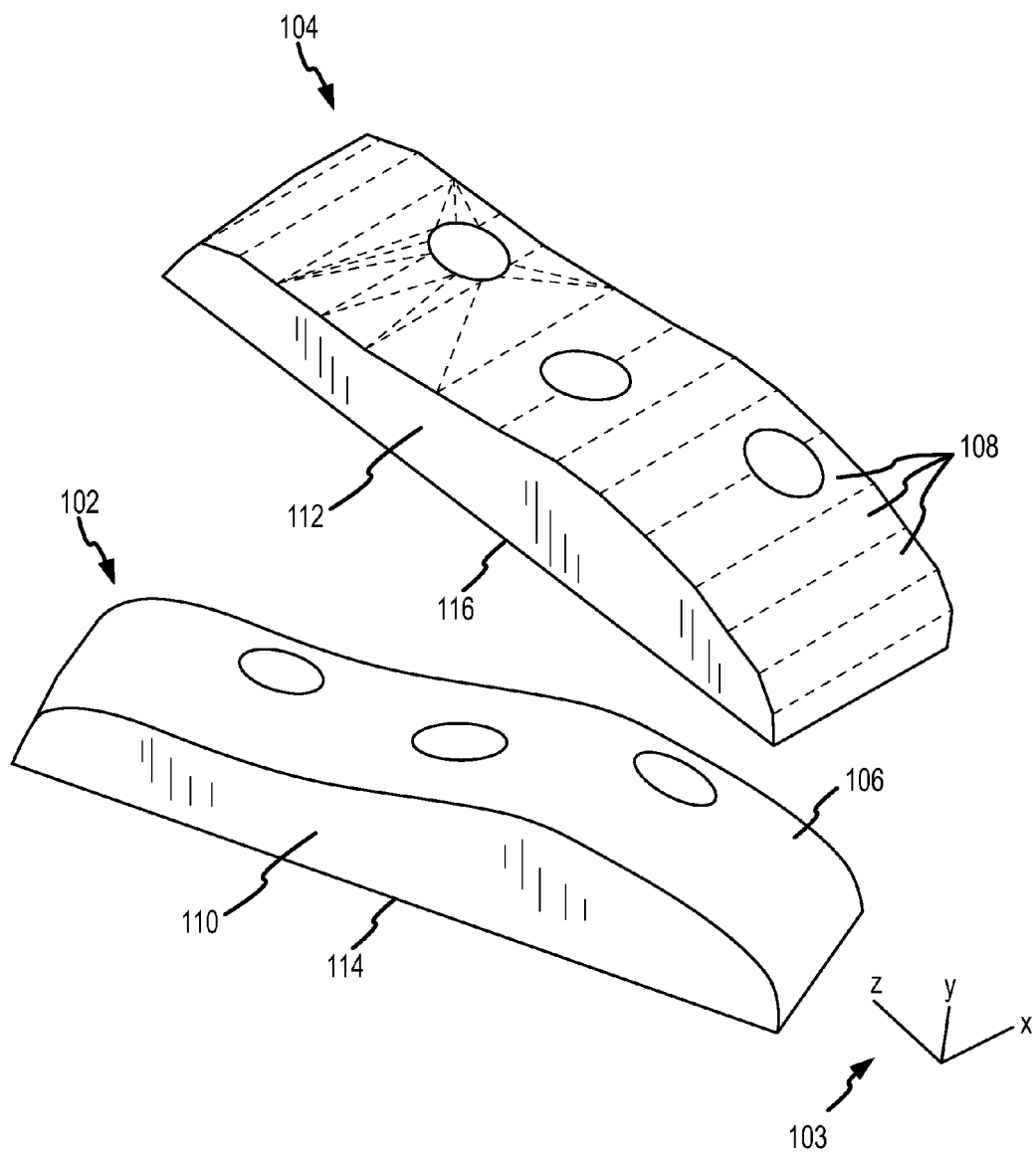
FIG. 1 depicts a master model and a corresponding tessellated target model useful in describing the present invention.

Referring to FIG. 1, a master model (also referred to as the "exact," or "authoritative" model) 102 and a target model (also referred to as the "approximate" model) 104 are shown in a three-dimensional space having an arbitrary coordinate axis 103. It will be understood that the model geometry of FIG. 1 is presented for example purposes only. Furthermore, while the illustrated embodiment involves a precise master model and a simplified target model, the present invention is not so limited, and can be used in conjunction with any combination of two types of models (e.g., two different types of simplified models, etc.) For example, the present invention may be used with master/target combinations of BRep/BRep, tessellated/tessellated, tessellated/BRep, and BRep/tessellated.

In the illustrated embodiment, master model 102 includes a precise definition of a three-dimensional solid. As used herein to refer to a model, the phrase "precise definition" means a representation of the solid that defines its shape with substantial exactness, mathematically or otherwise. One such model is a boundary representation (or "BRep") model, which is a CAD model that stores information about a three-dimensional solid object based on its geometric and/or topological boundaries. Geometric boundary information includes, for example, point, line, surface (plane, sphere, cone, splines, or toroid), solid, and void. Topological boundary information includes, for example, vertex, edge, face, shell, and the like. The nature of BRep models (and method of creating such models using CAD systems) is well known in the art, and thus need not be described exhaustively herein. For more details regarding such models, see, e.g., A. A. G. Requicha, "Representation for Rigid Solids: Theory, Methods, and Systems," ACM Computing Surveys, Vol. 12, No. 4, December 1980, pp. 437-464.

Target model 104, in this embodiment, includes a simplified definition of a three-dimensional solid—i.e., a definition that is not "precise" as that term is used in connection with master model 102. One such model is a tessellated model, as depicted in FIG. 1. A tessellated model is an approximation of a three-dimensional object in which surfaces are modeled as a mesh, or tiling, of connected planar regions. The tessellation for an object dispenses with storage-intense history tree for the object, and approximates curved surfaces and non-linear edges with planar faces and line segments. As mentioned previously, one disadvantage of tessellated models is that they do not precisely represent an object, and thus provide inexact interference checks and only approximate mass and inertial properties (e.g., as weight and center-of-gravity).

As seen in FIG. 1, while master model 102 has a smooth, continuous surface 104 along its top side, the corresponding portion of target model 108 includes a series of adjacent polygons 108 whose combined contour only approximates that of surface 106. The present invention is not limited to simplified models that are tessellated, however; other simplified models may also be used.

A given assembly (e.g., of automotive parts, aircraft components, or the like) will typically consist of many such models defined and stored in a suitable mass storage device. In certain CAD systems, the assembly is defined by an assembly tree, wherein individual components exist as instances of a set of master models. In this context, an "instance" is a rigid motion (i.e., non-deforming translation and/or rotation) applied to a master model.

Thus, it is desirable to determine a rigid body motion that, when applied to master model 102, will result in optimum spatial matching of an instance of the master model 102 with existing target model 104 within an assembly. As mentioned previously, the relative inexact nature of target model 104 makes it difficult to find a spatial match using center-of-gravity, inertial axis, or the like, as such attributes are not preserved when the simplified model is created (e.g., through tessellation).

Figure 4:
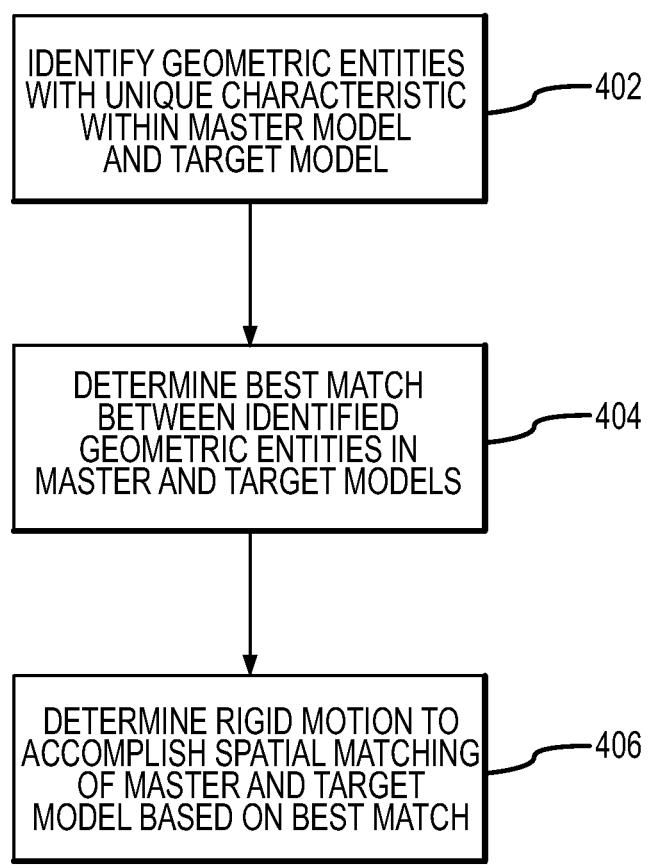
FIG. 4 is a flowchart showing a generalized positioning method in accordance with the present invention.

In accordance with the present invention, referring to the flowchart shown in FIG. 4, an automated method of matching models generally involves first identifying geometric entities with unique characteristics within both the master model and the target model (step 402), then determining the best match between these geometric entities (step 404). Finally, in step 406, a suitable rigid motion is determined using these matched geometric entities. In this regard, the methods described herein may be performed by a system comprising any combination of hardware, software, and firmware. In one embodiment, for example, the system includes a conventional digital computer with a monitor, one or more input-output devices, a mass storage device, one or more microprocessors, and software configured to run on a resident operating system. Such software might be in any suitable form (e.g., compiled, interpreted, etc.), and may be implemented using any computer language now known or later developed (e.g., C, C++, Java, Python, etc.).

Figure 5:
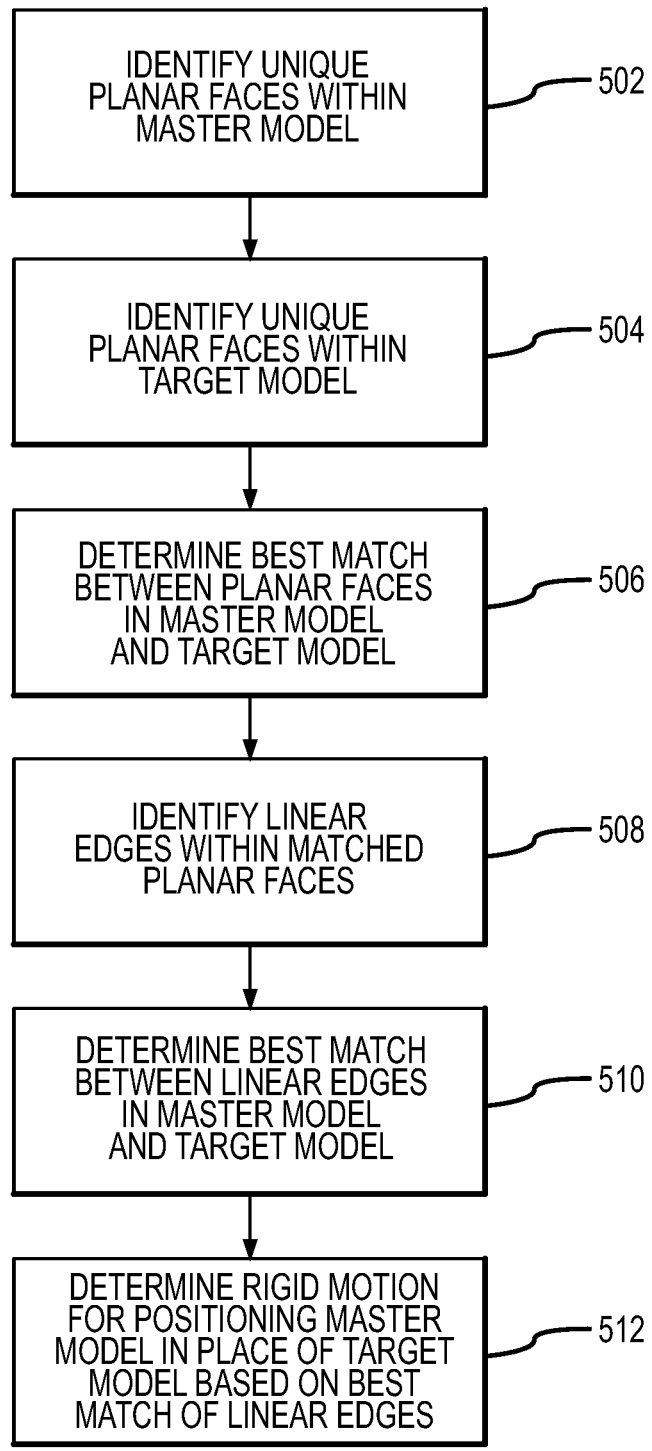
FIG. 5 is a flowchart showing a positioning method in accordance with one embodiment of the present invention.

Referring to the flowchart shown in FIG. 5, an exemplary method in accordance with one embodiment of the present invention will now be described. It will be appreciated that the illustrated process might include additional steps and/or may itself be part of a larger process. The illustrated method, as will be seen, profits from an appreciation that (1) many assemblies include planar faces, (2) planar faces often have linear edges, and (3) planar faces and linear edges are generally preserved during tessellation.

First, the system identifies unique planar faces within the master model (step 502) and the target model (step 504). As shown in FIG. 1, master model 102 includes at least one planar face 110. Similarly, target model 104 includes at least one planar face 112. Indeed, tessellated model 104 will, by its very nature, include many planar faces. However, because tessellation does not generally break up a planar surface into smaller sections, face 112 preserves many attributes of the "exact" corresponding face 110.

The system will identify a set of faces F for the master model, and a set of faces F' for the target model. These sets will typically have a different number of members. It is preferred that only "unique" faces be considered—that is, faces with a certain attribute or characteristic that is sufficiently different from other values of that characteristic for the model. This helps reduce the risk of error when comparing numerous similar faces on a solid model.

In one embodiment, the computed area of the planar faces is used to determine uniqueness, and only those faces with an area that is different from the area of the other faces, within a predetermined tolerance, are considered. Stated another way, if the areas of each planar face were to be plotted in histogram form, and assigned to bins, there would be bins with area values that are different from adjacent bins by a predetermined tolerance. There may be one, two, or more planar faces within a particular bin; however, in accordance with one embodiment of the present invention, the system considers no more than two faces per bin, or unique value. While this can result in two faces with nearly the same value, this value is considered "unique" as that term is used herein.

The predetermined tolerance may be selected to achieve the desired behavior of the system, and may be selected based upon a number of factors—e.g., average tessellation size, CAD system accuracy, size of the object, and the like. In general, heuristic methods may be used to determine this tolerance value, as will be appreciated by those skilled in the art.

Figure 2:
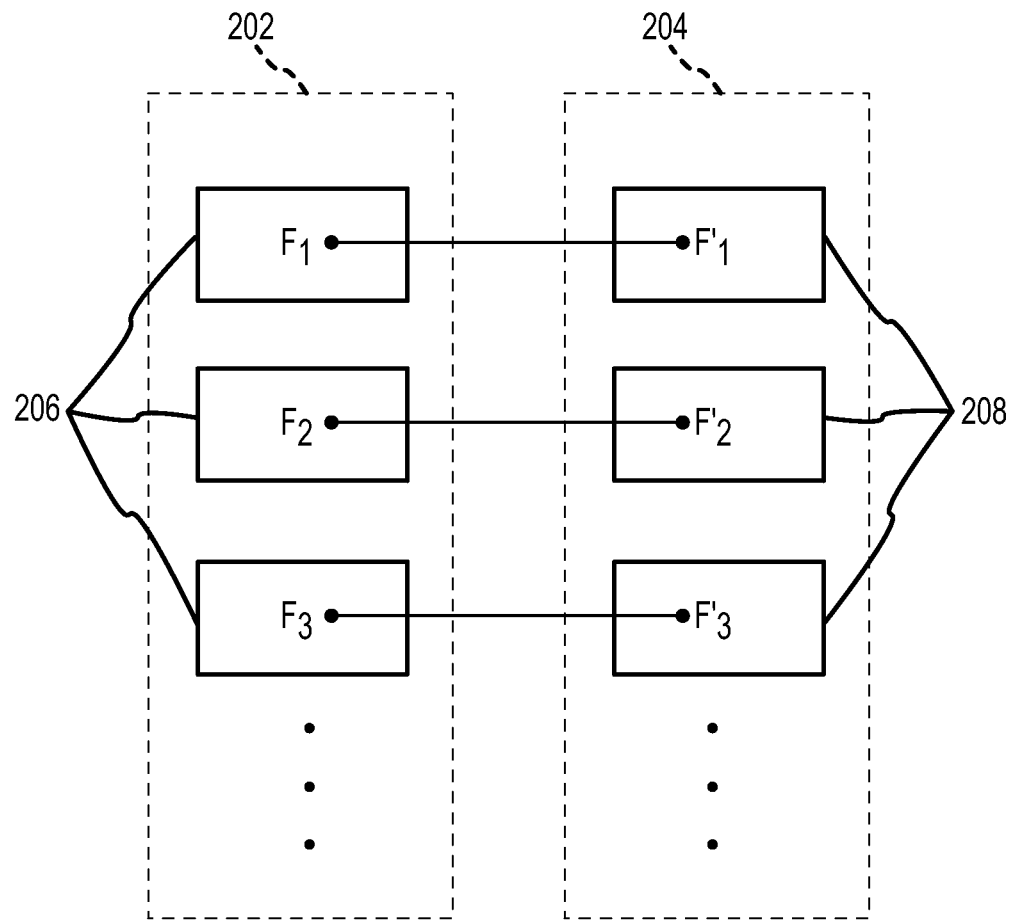
FIG. 2 is a conceptual block diagram depicting correspondence between sets of planar faces in a master model and a target model.

After the sets of faces for the master and target model are determined, the system finds, using any suitable algorithm, the best match between one or more planar faces in F (the master model) and one or more faces in F' (the target model) (step 506). That is, as shown conceptually in FIG. 2, a set 202 of faces 206 ($F_1, F_2, F_3, \ldots$) for the master model are mapped, identified, or otherwise associated with corresponding faces 208 ($F_1, F_2, F_3, \ldots$) within set 204 for the target model. In one embodiment, this matching starts with the largest areas first, and continuous down the list in descending order, and only those matched pairs of faces with a relative error below a certain threshold (which may predetermined by the user) are retained. This results in a list of ordered pairs ($F_i$, $F'_i$) and/or ordered pairs of face pairs.

The matching may be accomplished, for example, by comparing areas of the faces and minimizing an error function that relates to this comparison. In a particular embodiment, the Hungarian matching method (or "algorithm") is used. For more information regarding this method, see, e.g., H. W. Kuhn, The Hungarian Method for the Assignment Problem, Naval Research Logistics Quarterly, 2:83-97, 1955.

Next, in step 508, the system identifies linear edges within each matched pairs of faces or pairs of face pairs. That is, as can be seen in FIG. 1, many planar faces (110, 112) will include one or more linear edges (114, 116). These line segments can be compared (e.g., by comparing their length) to determine a best match between linear edges in matched planar faces from the master model and the target model (step 510). As with the planar areas, it is preferable for only unique linear segments (determined by their lengths, within a predetermined tolerance) to be retained.

Figure 3:
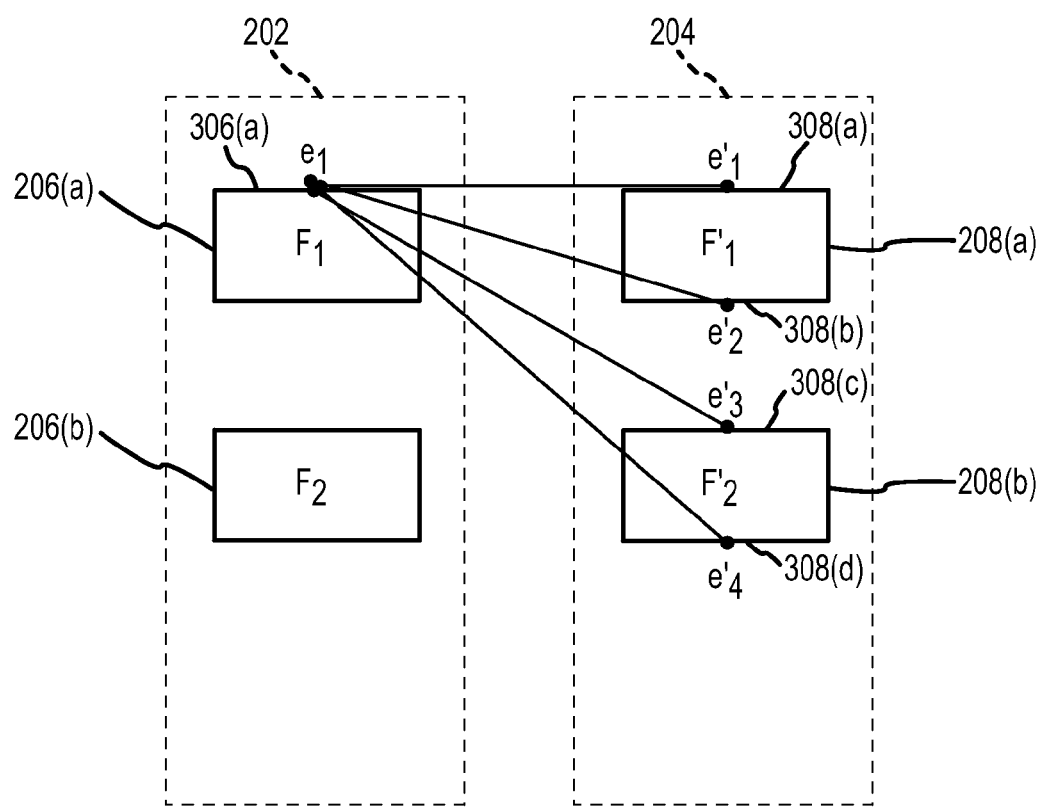
FIG. 3 shows a conceptual block diagram depicting correspondence between linear edges in matching planar faces.

For example, referring to the conceptual diagram of FIG. 3, in the worst case, a pair of faces 206(*a*) and 206(*b*) in the master model will be found (in step 506) to match a pair of faces 208(*a*) and 208(*b*) in the target model. In such a case, a single edge 306(*a*) ($e_1$) may match four separate edges 308(*a*)-(*d*) ($e'_1$-$e'_4$) in the target model. A suitable matching algorithm—e.g., the Hungarian matching algorithm—is used to determine the best match between these linear edges. The algorithm minimizes the distances between the faces' center of gravities for all the possible matches between edge e1 and candidate matching edges, the result of this process is two matching edges and faces.

When a match has been found between corresponding faces and corresponding linear edges at the periphery or interior of those faces, the system can determine a position and orientation (i.e., rigid motion) of the master model that will move it into the location occupied by the target model (step 512). This rigid motion may be computed in a number of ways. In one embodiment, for example, the midpoint and tangent of both matched edges are computed, as well as the outward normal of the faces they belong to. The point, the tangent, and normal together define a coordinate system (CS) on both parts. The transformation matrix to place the master is then: Rotation=Target_CS×Master_CS, and Translation=point on target−Rotation×point on master. The system may require a certain quality and/or quantity of information regarding corresponding line segments. For example, it may attempt to find at least two non-co-linear line segments from within at least two different planar faces. In one embodiment, if one match produces a computational error (e.g., fails to compute area), the next match can be used.

In an alternate embodiment, hole axes are used instead of or in addition to linear edges to compute the rigid body motion. Hole axes—which correspond to the line normal to a hole through its center—are also preserved during tessellation.

The depicted embodiments are provided as examples, and are not intended to limit the scope, applicability, or configuration of the invention in any way. Rather, the foregoing detailed description provides those skilled in the art with a convenient guide for implementing various embodiments of the invention. It should be understood that various changes can be made in the function and arrangement of elements without departing from the scope of the invention as set forth in the appended claims and the legal equivalents thereof.

What is claimed is:

1. A method of automatic spatial matching of models, the method comprising:
   providing, in machine-readable form, a first model comprising a definition of a three-dimensional solid;
   providing, in machine-readable form, a target model comprising a definition of the three-dimensional solid;
   identifying, using a processor, a first set of geometric entities in the first model that have a unique characteristic, including a first set of planar faces in the first model that have a unique area as compared to a set of other first model planar faces, wherein the unique area is unique when the unique area is within a predetermined tolerance, and including a first set of linear edges in the first set of planar faces;
   identifying, using the processor, a second set of geometric entities in the target model that have the unique characteristic, including a second set of planar faces in the target model that have the unique area as compared to a set of other target model planar faces, and including a second set of linear edges in the second set of planar faces;
   determining, using the processor, a best match between a member of the first set of geometric entities and a member of the second set of geometric entities by comparing the unique characteristic of the first set of geometric entities and the second set of geometric entities to form a comparison and minimizing an error function on the comparison, including determining a best planar face match, based on an area measurement, between the first set of planar faces and the second set of planar faces and a best linear edge match, based on a length measurement, between the first set of linear edges and the second set of linear edges; and
   computing a rigid body motion to be applied to the first model such that said first model is substantially coincident with the target model, wherein computing the rigid body motion further comprises:
      determining a midpoint and a tangent of matching edges from the best linear edge match;
      determining an outward normal of matching faces from the best planar face match; and
      determining a transformation matrix to place the master model based on a coordinate system comprising the midpoint, the tangent, and the outward normal.

2. The method of claim 1, wherein the first model includes a boundary representation of the three-dimensional model (BRep).

3. The method of claim 1, wherein the target model is a tessellated model.

4. The method of claim 1, wherein the step of identifying the first set of geometric entities includes identifying a first set of planar faces, each having a unique area within a predetermined tolerance, and the step of identifying the second set of geometric entities includes identifying a second set of planar faces, each having a unique area within the predetermined tolerance.

5. The method of claim 4, wherein the step of determining the best match includes finding a best match between said first set of planar faces and said second set of planar faces to produce an ordered pair of matching faces.

6. The method of claim 5, wherein the step of determining the best match further includes identify linear edges for each planar face within the ordered pair of matching faces and determining the best correspondence between the linear edges.

7. The method of claim 6, wherein the step of determining the best correspondence between linear edges includes performing a Hungarian matching algorithm.

8. The method of claim 1, wherein computing the rigid body motion to be applied to the first model such that said first model is substantially coincident with the target model includes determining a position and an orientation of the first model that moves the first model into a second model location.

9. The method of claim 1, wherein the source model and the target model are not substantially coincident prior to providing, in machine-readable form, the first model comprising the definition of the three-dimensional solid, wherein the first set of geometric entities is a first set of faces, and wherein the second set of geometric entities is a second set of faces.

10. A digital computer system of the type including a display, an input-output device, a processor, and a storage device having software code residing therein, the digital computer system configured to perform the steps of:

receiving a master model comprising a precise definition of a three-dimensional solid;

receiving a target model comprising a simplified definition of the three-dimensional solid;

identifying a first set of geometric entities in the master model that have a unique characteristic, including a first set of planar faces in the master model that have a unique area as compared to a set of other first model planar faces, wherein the unique area is unique when the unique area is within a predetermined tolerance, and including a first set of linear edges in the first set of planar faces;

identifying a second set of geometric entities in the target model that have the unique characteristic, including a second set of planar faces in the target model that have the unique area as compared to a set of other target model planar faces, and including a second set of linear edges in the second set of planar faces;

determining a best match between a member of the first set of geometric entities and a member of the second set of geometric entities by comparing the unique characteristic of the first set of geometric entities and the second set of geometric entities to form a comparison and minimizing an error function on the comparison, including determining a best planar face match, based on an area measurement, between the first set of planar faces and the second set of planar faces and a best linear edge match, based on a length measurement, between the first set of linear edges and the second set of linear edges; and computing a rigid body motion to be applied to the first model such that said first model is substantially coincident with the target model, wherein computing the rigid body motion further comprises:

determining a midpoint and a tangent of matching edges from the best linear edge match:

determining an outward normal of matching faces from the best planar face match; and determining a transformation matrix to place the master model based on a coordinate system comprising the midpoint, the tangent, and the outward normal.

11. The system of claim 10, wherein the master model includes a boundary representation of the three-dimensional solid (BRep), and the target model is a tessellated model.

12. The system of claim 10, wherein the system is further configured to compute a rigid body motion to be applied to the master model such that said master model will be substantially coincident with the target model.

13. The system of claim 10, wherein system is configured to identify the first set of geometric entities by identifying a first set of planar faces, each having a unique area within a predetermined tolerance, and to identify the second set of geometric entities by identifying a second set of planar faces, each having a unique area within the predetermined tolerance.

14. The system of claim 13, wherein the system determines the best match by finding a best match between the first set of planar faces and the second set of planar faces to produce an ordered pair of matching faces; and by identifying linear edges for each planar face within the ordered pair of matching faces and determining the best correspondence between the linear edges.

15. The system of claim 14, wherein the step of finding best match includes performing a Hungarian matching algorithm.

16. A method of automatic spatial matching of a master model comprising a precise definition of a three-dimensional solid with a target model comprising a simplified definition of the three-dimensional solid, the method comprising:

identifying, using a processor, a first set of planar faces in the master model that have a unique area as compared to a set of other master model planar faces, wherein the unique area is unique when the unique area is within a predetermined tolerance;

identifying, using the processor, a second set of planar faces in the target model that have the unique area as compared to a set of other target model planar faces;

determining a best planar face match, based on an area measurement, between the first set of planar faces and the second set of planar faces;

identifying a first set of linear edges in the first set of planar faces and a second set of linear edges in the second set of planar faces;

determining a best linear edge match, based on a length measurement, between the first set of linear edges and the second set of linear edges; and determining a rigid body motion, based on the best linear edge match between the first and second set of linear edges, to be applied to the master model such that the master model is substantially coincident with the target model, wherein the rigid body motion comprises a position and an orientation of the master model that moves the master model into a target model location, and wherein determining the rigid body motion further comprises:

determining a midpoint and a tangent of matching edges from the best linear edge match:

determining an outward normal of matching faces from the best planar face match; and determining a transformation matrix to place the master model based on a coordinate system comprising the midpoint, the tangent, and the outward normal.

17. The method of claim 16, wherein at least one of the steps of determining the best match between the first and second set of linear edges and determining the best match between the first and second set of planar faces includes performing a Hungarian matching algorithm.

* * * * *